United States Patent [19]

Teramoto et al.

[11] Patent Number: 5,049,169
[45] Date of Patent: Sep. 17, 1991

[54] POLYSULFONE SEPARATION MEMBRANE

[75] Inventors: Takerou Teramoto; Shingo Kazama; Tsutomu Kaneta; Masao Sakashita; Masaya Furukawa; Kazuto Shiraishi, all of Kawasaki, Japan

[73] Assignees: Nippon Steel Corporation; Nippon Steel Chemical Co., Ltd., both of Tokyo, Japan

[21] Appl. No.: 526,431

[22] Filed: May 22, 1990

[30] Foreign Application Priority Data

| May 23, 1989 | [JP] | Japan | 1-127927 |
| May 23, 1989 | [JP] | Japan | 1-127928 |
| Aug. 31, 1989 | [JP] | Japan | 1-223088 |
| Aug. 31, 1989 | [JP] | Japan | 1-223089 |

[51] Int. Cl.$^5$ ............... B01D 53/22; B01D 71/68
[52] U.S. Cl. ........................... 55/158; 55/16; 55/68; 210/500.41
[58] Field of Search ............... 55/16, 68, 158; 210/500.41

[56] References Cited

U.S. PATENT DOCUMENTS

| 4,568,579 | 2/1986 | Watson | 55/16 X |
| 4,813,983 | 3/1989 | Nohmi et al. | 55/16 X |
| 4,818,254 | 4/1989 | Anand et al. | 55/16 |
| 4,948,400 | 8/1990 | Yamada et al. | 55/158 |
| 4,952,220 | 8/1990 | Langsam et al. | 55/158 |

FOREIGN PATENT DOCUMENTS

| 58-008506 | 1/1983 | Japan | 55/158 |
| 58-008516 | 1/1983 | Japan | 55/158 |
| 63-190607 | 8/1988 | Japan | 55/158 |
| 63-278524 | 11/1988 | Japan | 55/158 |
| 1-194904 | 8/1989 | Japan | 55/158 |
| 1-194905 | 8/1989 | Japan | 55/158 |

Primary Examiner—Robert Spitzer
Attorney, Agent, or Firm—Cushman, Darby & Cushman

[57] ABSTRACT

A separation membrane comprising a soluble aromatic polysulfone having the formula —(X—Y)—, wherein X and Y comprise the constituent unit shown below, and the inherent viscosity ($\eta_{inh}$) based on the value of a solution of 0.5 g of the polysulfone dissolved in 100 ml of N-methyl-2-pyrrolidone measured at 30° C. is 0.4 or more:

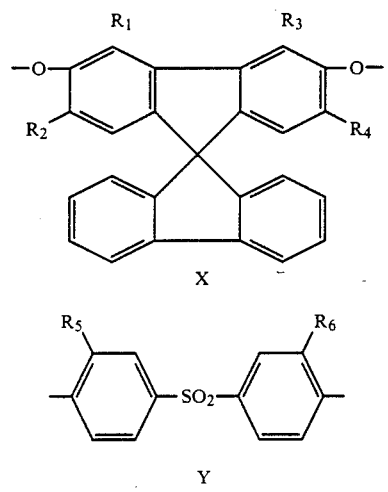

wherein $R_1$–$R_4$ are each either H, $CH_3$ or $C_2H_5$, and $R_5$–$R_6$ are each either H, Cl, or $NO_2$.

5 Claims, 1 Drawing Sheet

POLYSULFONE SEPARATION MEMBRANE

BACKGROUND OF THE INVENTION

1. Field of the Invention

The present invention relates to a polysulfone separation membrane which exhibits a high oxygen rate and high oxygen nitrogen selectivity not found in the prior art, and a superior heat resistance and chemical resistance, and a method of preparing same. The polysulfone asymmetric membrane, e.g., polysulfone asymmetric hollow fiber membrane comprising the polysulfone as the base material, has a high oxygen nitrogen selectivity and can be used for obtaining oxygen-enriched air having an oxygen concentration of 40%, which can be used for medical and biological uses, or nitrogen-enriched air having a nitrogen concentration of 95% or higher, which can be used for food storage and to prevent explosions in an organic solvent tank. Further, this membrane can be used for removing carbon dioxide from a combustion furnace and from natural gas.

2. Description of the Related Art

The utilization of nitrogen-enriched air with a nitrogen concentration of 95% to 99.5% has long attracted attention, and as an example of the use of this nitrogen-enriched air, an attempt has been made to prevent explosions by filling a combustible liquid storage tank with the nitrogen-enriched air, since this is an inert gas. The nitrogen-enriched air is produced directly from the atmosphere by a membrane separation technique, and when obtaining nitrogen-enriched air by this membrane separation technique, non-permeated gas having a lower oxygen concentration can be used by increasing the amount of gas permeated through the membrane, by using an oxygen permselective membrane. In this case, if the membrane has a high oxygen/nitrogen selectivity, a nitrogen-enriched air having a desired nitrogen concentration can be efficiently produced while using less energy. A large volume of gas must be treated to obtain nitrogen-enriched air on an industrial scale by the membrane separation technique, and thus a membrane having a higher oxygen permeation rate is required. Nevertheless, among presently commercially available oxygen enrichment membranes, a membrane having a combination of a high oxygen/nitrogen selectivity and a high oxygen permeation rate is not known, and the production of a nitrogen-enriched air utilizing membrane is limited.

The production of a gas separation membrane having a high oxygen permeation rate and high oxygen nitrogen selectivity has become possible due to the development of a polymeric material and the development of a separation membrane preparation method. The aim of this development is to develop a base material which (1) has a high oxygen permeation coefficient, (2) has a high oxygen/nitrogen selectivity, (3) is capable of being formed into a thin film and (4) can withstand a high temperature gas. In the development of a polymeric material with a high oxygen permeation coefficient, for example, the development of a polydimethylsiloxane type material is known (see, for example, PB Rep. No. PB-85-148476, but this membrane is formed of a dimethylsiloxane type material and has a limited oxygen/nitrogen selectivity and a poor heat resistance, and thus cannot be used in a high temperature process.

The utilization of a separation membrane for a high temperature process has been investigated, and the development of membrane materials having a good heat resistance is underway. For example, polysulfone obtained from a sodium salt of bisphenol A and 4,4'-dichlorodiphenylsulfone is known as a membrane base material having a good heat resistance, but the glass transition temperature (Tg) thereof (180° C.) is not enough, at 180° C., and a further improvement of the heat resistance thereof is required.

As a method of improving the heat resistance, the introduction of a bisphenylfluorene group is known; for example, a polysulfone obtained from 9,9-bis(4-hyiroxyphenyl)fluorene and dichlorodiphenylsulfone has a glass temperature (Tg) of 280° C. A method of synthesizing a polysulfone containing a bisphenylfluorene group has been reported by Hergenrother et al, (P. M. Hergenrother et al, Polymer, vol 29, p. 358-369, 1988), but according to this method the polysulfone obtained from 9,9-bis(4-hydroxyphenyl)fluorene and dichlorodiphenylsulfone has only an inherent viscosity ($\eta_{inh}$) of about 0.67 dl/g (in m-cresol, measured in a solution containing 0.5% of polysulfone dissolved therein at 30° C.), and an improvement of the degree of polymerization is required to improve the strength of the polysulfone molded product.

As the thickness of the gas selective functional layer and the permeation rate per membrane unit area have an inversely proportional relationship, the aim of the development target of the separation membrane preparation method is to form the gas selective functional layer as a thin layer. Further, it is important to obtain a hollow fiber membrane formation, to increase the membrane area per module unit volume area. As a prior art method by which these problems are solved, it has been proposed to form a composite of a thin film having a required functional ability, and a supporting porous film. For example, an attempt has been made to prepare a very thin gas separation layer of about 30 nm by adding the polycarbonate-polydimethylsiloxane block copolymer solution dropwise onto the surface of a liquid cast support, to thereby form a composite with a microporous flat film, such as a Millipore ultrafiltration film, etc. (See Japanese Unexamined Patent Publication (Kokai) No. 54-40868 or U.S. Pat. No. 4132824). Nevertheless, the preparation of a composite membrane having such an extremely thin gas selective functional layer on the surface, without defects such as pinholes or cracks, is difficult in practice.

A more preferable method of forming a thin gas selective active layer is to produce an asymmetric skinned membrane having a structure in which a thin layer on the membrane surface, called a skin layer, is supported on a porous layer, called a finger layer, and a sponge layer, by dissolving a polymer in an appropriate solvent and desolventizing the solution by contact with a coagulation liquid which is miscible with the solvent but does not dissolve the polymer (see, for example, C. A. Smolders et al., "Hollow Fiber Gas Separation Membranes; Structure and Properties", p. 145 in "Membranes in Gas Separation and Enrichment, 4th Boc. Priestley Conference, Royal Society, 1986). This method has specific features such that the thin layer can be formed without the need for the cumbersome operation of forming a composite, and that a hollow fiber membrane can be easily obtained. Nevertheless, in this method the polymer must be soluble in the solvent, and a suitable combination of a polymer/polymer solvent/coagulation liquid must be obtained. If these conditions are not satisfied, even if an asymmetric structure is obtained, either no gas selectivity is exhibited or such a selectivity, if any, is usually lower than that of a uniform film. As an example of the asymmetric skinned gas separation membrane, a separation membrane having an oxygen permeation rate of $3.53 \times 10^{-3}$ Nm$^3$/m$^2$·hr·atm and an oxygen/nitrogen selectivity of 3.7 is disclosed in Japanese Unexamined Patent Publication (Kokai) No. 58-8504, and a separation membrane having an oxygen permeation rate of $3.2 \times 10^{-2}$ Nm$^3$/m$^2$·hr·atm and an oxygen/nitrogen selectivity of 4.8 is disclosed in Japanese Unexamined Patent Publication (Kokai) No. 61-90709. These asymmetric skinned membranes, however, have a low oxygen permeation rate and oxygen nitrogen selectivity, and an improvement of those characteristics is required.

SUMMARY OF THE INVENTION

Accordingly, the objects of the present invention are to eliminate the above-mentioned disadvantages of the prior art and to provide an aromatic polysulfone gas separation membrane having a high oxygen permeation rate and a high oxygen/nitrogen selectivity, and a superior heat resistance, chemical resistance, and mechanical strength, by a simple preparation method.

Other objects and advantages of the present invention will be apparent from the following description.

In accordance with the present invention, there is provided a gas separation membrane comprising a soluble aromatic polysulfone having the formula—(X-Y)—, wherein X and Y are the constituent units shown below, and having an inherent viscosity ($\eta_{inh}$) of at least 0.4, measured from a solution of 0.5 g of the polysulfone dissolved in 100 ml of N-methyl-2-pyrrolidone at 30° C.

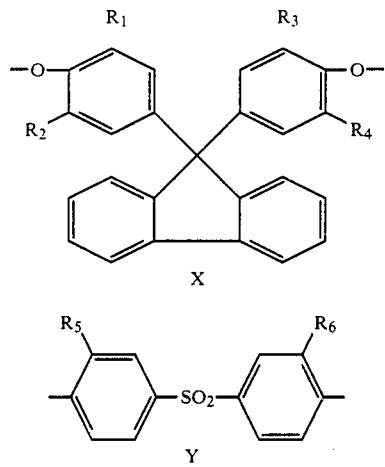

wherein $R_1$ to $R_4$ are independently H, CH$_3$ or C$_2$H$_5$, and $R_5$ and $R_6$ are independently H, Cl or NO$_2$.

Further, in accordance with the present invention there are provided a polysulfone composite membrane comprising the soluble aromatic polysulfone as specified above, as the gas selective active layer provided with a thickness of 10 nm to 1 μm on a porous support with a pore diameter on the surface of 1 μm or less, and a polysulfone asymmetric skinned membrane derived from the above-mentioned soluble aromatic polysulfone by dissolving the same in a polar solvent to form a polymer solution, followed by desolventizing the solution by contact with a coagulation liquid which is miscible with the solvent of the polymer solution but does not dissolve the polysulfone.

BRIEF DESCRIPTION OF THE DRAWING

The present invention will be better understood from the description set forth below with reference to the accompanying drawing of FIG. 1, which shows the SEM image of the hollow fiber membrane of Example 8.

DESCRIPTION OF THE PREFERRED EMBODIMENTS

Figure 1:

In the description of the present invention given hereinafter, the polysulfone is represented by the kinds of the constituent units. Namely, the constituent unit of the aromatic polysulfone represented substantially by the formula—(X-Y)—are represented by Xr1, r2, r3, r4 and Yr5, r6 as shown below:

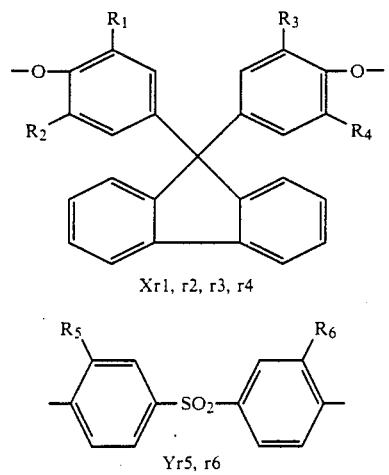

and the polysulfone used in the present invention is represented as [Xr1, r2, r3, r4/Yr5, r6]. Here, r1 –r4 represent the respective kinds of R$_1$-R$_4$ in the above constituent units, wherein the numerals 1, 2, and 3 indicate that R$_1$-R$_4$ in the constituent units Xr1, r2, r3, r4 are H, CH$_3$, C$_2$H$_5$, in the order of the numerals 1, 2, 3, and in the constituent unit Yr5, r6, indicate by numerals 1, 2, and 3 that R$_5$-R$_6$ in the constituent unit Yr5, r6 are H, Cl, NO$_2$, in that order. When r1 –r4 are indicated by the same numeral (i.e., when R$_1$-R$_4$ are the same), Xr1, r2, r3, r4 is represented as Xr1, and similarly, when r5, r6 are indicated by the same numeral, Yr5, r6 is represented by Yr5, to thereby simplify this representation. For example, a polysulfone wherein all of R$_1$-R$_6$ are H is represented by [X$_1$/Y$_1$].

Further, to represent a polysulfone comprising 3 or more kinds of constituent units, the molar ratio of the respective constituent units in the formula —(X-Y)—is also shown. For example, a polysulfone comprising X$_1$ (the constituent unit wherein R$_1$ –R$_4$ are all H in the constituent unit X), Y$_1$ (the constituent unit wherein R$_5$ –R$_6$ are H in the constituent unit Y), and Y$_2$ (the constituent unit wherein R$_5$ –R$_6$ are Cl in the constituent unit Y), wherein the molar ratio of the constituent units is X$_1$:Y$_1$:Y$_2$=1:0.9:0.1, is represented as [X$_1$/Y$_1$−Y$_2$ (0.9−0.1)]. The molar ratios are represented in such a manner that the total of the molar ratio of the constituent units in the respective systems (Xr1, r2, r3, r4 system and Yr5, r6 system) is 1, and are omitted in the case of one kind of the constituent unit in X and/or Y. Examples of the synthesis methods and representation methods are shown as follows.

In the present invention, as the starting material for X, bisphenolfluorenes such as 9,9-bis(4-hydroxyphenyl)fluorene, 9,9-bis(3,5-dimethyl-4-hydroxyphenyl)fluorene, 9,9-bis(3-methyl-4-hydroxyphenyl)fluorene, 9,9-bis(3-ethyl-4-hydroxyphenyl)fluorene, 9,9-bis(3,5-diethyl-4-hydroxyphenyl)fluorene, which are substances which can be easily prepared by the use of fluorenes contained in coal tar and phenols as the starting materials, can be included.

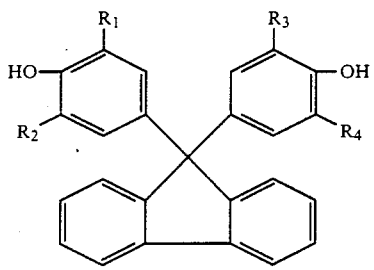

(wherein $R_1$–$R_4$ are each either H, $CH_3$, or $C_2H_5$).

As the starting material for Y, there may be included 4,4'-dichlorodiphenylsulfone, 3,3'-4,4'-tetrachlorodiphenylsulfone, and 4,4'-dichloro-3,3'-dinitodiphenylsulfone, as shown below:

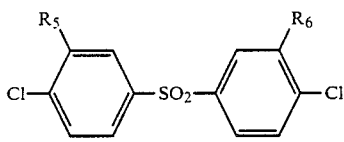

(wherein $R_5$–$R_6$ are each either H, Cl, or $NO_2$).

The method of synthesizing the polysulfone used as the separation membrane material of the present invention, for example, an aromatic polysulfone comprising the constituent unit Xl and the constituent unit Yl, can be carried out according to the process disclosed by P. M. Hergenrother et al., by charging 9,9-bis(4-hydroxyphenyl)-fluorene, 4,4'-dichlorodiphenylsulfone, potassium carbonate, N,N-dimethylacetamide, and toluene into a three-neck flask, dehydrating the mixture by using a Dean-Stark trap, removing the distilled out toluene until the reaction temperature becomes 150° C., carrying out the reaction for 15 hours and cooling the mixture to room temperature, removing KCl, which is the by-product, by filtration, and pouring the filtrate into methanol to effect reprecipitation, whereby a polymer having an inherent viscosity of about 0.59 dl/g, measured from a solution of 0.5 g of the polysulfone dissolved in 100 ml of N-methyl-2-pyrrolidone at 30° C., can be quantitatively obtained (P. M. Hergenrother et al., Polymer, vol. 29, p. 358-369, 1988).

In view of the mechanical strength of the polysulfone membrane, i.e., the polysulfone asymmetric gas separation membrane, preferably the polysulfone has a higher degree of polymerization. To obtain a polysulfone having a higher degree of polymerization, under the reaction conditions mentioned above, by increasing the amount of toluene, suppressing the reflux temperature at 120° C. to continue heating for 6.5 hours and remove water by azeotropic distillation, removing toluene and elevating the solution temperature to 150° C., followed by continuing the azeotropic distillation of water for 15 hours, a polysulfone with a maximum inherent viscosity ($\eta_{inh}$) of 1.57 dl/g, measured from a solution of 0.5 g of the polysulfone dissolved in 100 ml of N-methyl-2-pyrrolidone at 30° C., can be obtained. The polymer obtained is represented as $[X_1/Y_1]$.

The degree of polymerization can be improved by replacing a part of the 4,4'-dichlorodiphenylsulfone with 3,3',4,4'-tetrachlorodiphenylsulfone. For example, a polysulfone having 1% of 4,4'-dichlorodiphenylsulfone replaced with 3,3',4,4'-tetrachlorodiphenylsulfone can provide a polymer having an inherent viscosity of 1.9 dl/g, measured from a solution of 0.5 g of the polysulfone dissolved in 100 ml of N-methyl-2-pyrrolidone at 30° C., by the reaction method according to P. M. Hergenrother et al. The polymer obtained is represented as $[X_1/Y_1-Y_2 (0.99-0.01)]$.

Further, the degree of polymerization can be easily improved by replacing a part of the 4,4'-dichlorodiphenylsulfone with 3,3',4,4'-tetrachlorodiphenylsulfone, because a part of 3,3'-chloro atoms may have possibly undergone the reaction to form a crosslinked structure. Also, the selectivity can be improved by using 3,3',4,4'-tetrachlorodiphenylsulfone.

The synthesis method as described above is only an example, and the method of synthesizing the film material for the polysulfone membrane of the present invention is not limited thereto.

The polysulfone to be used in the present invention may have any desired molar ratio between the constituent units Xr1, r2, r3, r4, and any desired molar ratio between the constituent units Yr5, r6, provided that the total of the moles of the constituent units X, Y coincide as in the example of the polysulfone $[X_1/Y_1-Y_2 (0.99-0.01)]$.

The degree of polymerization of the polysulfone to be used in the present invention must be 0.4 dl/g or more, preferably 0.5 to 2.0 dl/g in terms of the inherent viscosity based on the value of a solution of 0.5 g of the polysulfone dissolved in 100 ml of N-methyl-2-pyrrolidone measured at 30° C. If the polysulfone has an inherent viscosity lower than the above value (0.4 dl/g), a gas separation membrane having a practically useful mechanical strength cannot be obtained. If the degree of polymerization of the polysulfone is equal to or is higher than the above-mentioned value (0.4 dl/g), the polysulfone separation membrane can be prepared, but if the degree of polymerization is low, the viscosity of the polymer solution is low, and thus the control of the polymer solution during the preparation of separation membrane becomes difficult; if the degree of polymerization is too high, the viscosity of the polymer solution is high, and thus the workability during filtration, etc., becomes poor. Accordingly, a polysulfone having an inherent viscosity based on the above measurement of 0.5 to 1.0 dl/g is most preferable.

The polysulfone obtained is practically used as an asymmetric membrane, for example, asymmetric skinned membrane or composite membrane (S. A. Stern, "New Developments in Membrane Processes for Gas Separations", p. 1-38 in 'Synthetic Membrane', harwood academic publishers, 1986).

Preferably, in the polysulfone to be used in the present invention, the hydroxyl group at the polymer end is replaced by a hydrophobic group such as a benzoyl group, to improve the stability of the solution state.

The polysulfones as the material for the separation membrane of the present invention are soluble in polar solvents such as N,N-dimethylacetamide. Also, regardless of whether the constituents $R_1-R_4$ in the polysulfone [Xr1, r2r3, r4/Yr5, r6] are H, $CH_3$, or $C_2H_5$, or $R_5-R_6$ are H, Cl, or $NO_2$, there is no great difference in the solubility thereof. Table 1 shows an example of the solubility of the polysulfone used in the present invention.

TABLE 1

| Polysulfone | Solvent | | |
|---|---|---|---|
| | Sulforane | DMAC | NMP |
| $[X_1/Y_1]$ | ○ | ○ | ○ |
| $[X_1/Y_2]$ | ○ | ○ | ○ |
| $[X_1/Y_3]$ | ○ | ○ | ○ |
| $[X_2/Y_1]$ | ○ | ○ | ○ |
| $[X_2/Y_2]$ | ○ | ○ | ○ |
| $[X_2/Y_3]$ | ○ | ○ | ○ |
| $[X_3/Y_1]$ | ○ | ○ | ○ |
| $[X_3/Y_2]$ | ○ | ○ | ○ |
| $[X_3/Y_3]$ | ○ | ○ | ○ |

Solubility confirmation concentration: polymer 10 parts by weight, solvent 100 parts by weight
DMAC: N,N-dimethylacetamide
NMP: N-methyl-2-pyrrolidone As clear from Table 1, the polysulfone used in the present invention has a superior solubility.

Further, the polysulfones used as the film materials for the separation membrane of the present invention have a superior heat resistance, chemical resistance, and mechanical strength. For example, the polysulfone $[X_1/Y_1]$ has a glass transition temperature of 280° C. and a decomposition initiation temperature of 400° C. Also, the shape of the film of this polysulfone $[X_1/Y_1]$ suffers no recognizable change even after immersion in an organic solvent, acid, or alkali solution (chemicals used in the test are shown in Table 2) for 48 hours. Further, the tensile strength of the polysulfone $[X_1/Y_1]$ film is 11 kg/mm², and thus this material has a superior mechanical strength. Further, this value is not changed even after immersion in an organic solvent, strong acid, or strong alkali for 48 hours. Table 2 shows examples of the heat resistance, chemical resistance, and mechanical strength of the polysulfone used in the present invention. The polysulfone to be used in the present invention exhibits no great difference in the heat resistance, chemical resistance, and mechanical strength thereof, regardless of whether $R_1-R_4$ is H, $CH_3$, or $C_2H_5$, or $R_5-R_6$ is H, Cl, or $NO_2$, and the polysulfone asymmetric gas separation membrane has a superior heat resistance, chemical resistance, and mechanical strength.

TABLE 2

| Polysulfone *1 | Glass transition temperature °C. | Decomposition initiation temperature °C. | Tensile strength kg/mm² | Tensile strength after immersion in chemical *2 kg/mm² |
|---|---|---|---|---|
| $[X_1/Y_1]$ | 280 | 400 | 11 | 11 |
| $[X_1/Y_2]$ | 280 | 400 | 10 | 10 |
| $[X_1/Y_3]$ | 275 | 400 | 11 | 11 |

*1 Polymer with inherent viscosity of about 0.8 dl/g used
*2 Test film of 100 mm × 100 mm immersed in individual chemicals shown below for 48 hours, and the tensile test conducted to determine film strength Chemicals used in test: 2% HCl, 0.5% $HNO_3$, 5% $H_2SO_4$, 20% NaOH, 20% $H_3PO_4$, 20% $CH_3COOH$, 10% $(CH_2COOH)_2$, 28% $NH_4OH$, sodium hypochloride (effective chlorine 500 ppm), 2% trichloroacetic acid, 10% formalin, 100% methanol, 100% ethylene glycol, 100% ethanol, 100% glycerine, 100% acetone, 100% tetrahydrofuran, 100% dioxane, 100% carbon tetrachloride, 100% chloroform, 100% triclene, 100% hexane, 100% benzene, 100% toluene, 100% methyl acetate, and 100% ethyl acetate the composite membrane of the polysulfone of the present invention can be prepared by the film formation method such as coating or spreading on water, but is not particularly limited to those methods. For example, the polysulfone may be dissolved in an appropriate solvent and a homogeneous solution thereof coated on a porous support by a bar coater, to a uniform thickness, followed by evaporation of the solvent by a dryer to obtain a composite membrane (coated-film composite type). Also, the polysulfone may be dissolved in a solvent immiscible with water, and the thin film obtained by adding the homogeneous solution dropwise onto the water surface can be put on a porous support to provide a composite membrane (thin-film laminate type).

When the obtained polysulfone composite membrane is observed by a scanning electron microscope (SEM), it is confirmed that it has a structure having a very thin polysulfone uniform film without pinholes. In this structure, the layer of the very thin polysulfone uniform film without pinholes is the gas selective active layer of the polysulfone composite membrane of the present invention.

The gas selective active layer of the polysulfone composite membrane of the present invention has a film thickness of 10 nm to 1 μm. In the composite membrane, ideally the gas selective active layer is as thin as possible, without pinholes, but it is practically impossible to fabricate an ultra-thin film with a thickness of less than 10 nm without pinholes. Further, if the film thickness exceeds 1 μm, the gas permeability becomes poor. In view of attaining both a high gas permeability and a handling ease, most preferably the film thickness is 50 to 300 nm.

The purpose of the porous support of the polysulfone composite membrane is to maintain an adequate membrane shape under the operational pressure of the gas separation, and to support the gas selective active layer having an insufficient strength, to prevent a breaking thereof. Accordingly, the porous support must have a sufficient mechanical strength and the pores on the support surface must be fine pores able to support the ultra-thin film. Also, when the composite membrane is prepared by the coating method, the support must be stable against the solvent for the polymer. In the porous support of the polysulfone composite membrane, when the gas selective active layer has a film thickness of 1 μm, the pore diameter of the porous support surface must be 1 μm or less, preferably 0.1 to 0.5 μm; the resistance to operational pressure becomes higher as the pore diameter becomes smaller. On the other hand, as the film thickness of the gas selective active layer becomes thinner, the required pore diameter becomes smaller. Also, when the composite membrane is prepared by the coating method, the support must be stable against m-cresol or DMAC etc., which is the solvent for polysulfone. Examples of such porous supports include porous Teflon films as represented by the Fluoropore ® Filter manufactured by Sumitomo Denko, porous polypropylene films as represented by the Juraguard ® manufactured by Polyplastic, and various porous membranes and porous asymmetric membranes manufactured by Millipore. Nevertheless, the materials used for the porous support of the polysulfone membrane of the present invention are not limited, provided that the above pore diameter and solvent stability conditions are satisfied.

The active gas separation layer of the polysulfone composite film of the present invention is a polysulfone uniform film without pinholes, and thus exhibits the required gas selectivity of the polysulfone material to be used in the present invention as such.

The method of preparing the polysulfone asymmetric skinned membrane comprises adding the polysulfone as described above to a polar solvent to form a polymer solution, and desolventizing the solution by contact with a coagulation liquid which is miscible with the solvent of the above polymer solution but does not dissolve the polysulfone, to thereby provide an asymmetric skinned membrane having a high oxygen permeation rate and oxygen/nitrogen selectivity. More specifically, by dissolving the polysulfone of the present invention in a polar solvent such as N,N-dimethylacetamide and N-methyl-2-pyrrolidone, carrying out a pressurized filtration, casting or coating the polymer solution, evaporating a part of the solvent for a certain period of time, and immersing the residue in an aqueous coagulation liquid to effect desolventization, a flat membrane is obtained. Also, the above-mentioned polymer solution is extruded through the annular opening of a hollow fiber spinning skinneret with a double-tube structure and an aqueous coagulation liquid through the circular opening, a part of the solvent evaporated by running through air, followed by desolventization by dipping into an aqueous coagulation liquid, to obtain a hollow fiber membrane. The polysulfone wet membrane obtained by such methods is dried in a conventional manner before use as the gas separation membrane. The polysulfone membrane of the present invention assumes an asymmetric structure comprising a gas selective active layer with a thin film surface, called a skin layer, and a porous layer supporting same.

In preparation of the polysulfone asymmetric gas separation membrane, the polar solvent for dissolving the polymer is preferably an aprotic polar solvent, as exemplified by N,N-dimethylformamide, N,N-dimethylacetamide, N-alkylpyrrolidone, and sulfone. The solvent may be used either alone or as a solvent mixture of two or more kinds thereof. Since the solvents employed are all hygroscopic, preferably the polymer solution is prepared in a dry gas atmosphere by using a glove box. Further, the polymer solution can be stored in dry gas atmosphere, to prevent a turbidity thereof due to humidity.

Also, to improve the storage stability of the obtained solution, preferably the polysulfone solution is treated at a temperature not higher than the boiling point of the solvent for a predetermined time. Further, the solution stability can be improved by an addition of an inorganic salt such as lithium chloride to the polysulfone solution.

The polysulfone asymmetric skinned membrane can be prepared if the polymer concentration is such that 10 to 50 parts by weight of the polysulfone are dissolved in 100 parts by weight of the solvent. If the concentration is lower, the viscosity of the polymer solution is low and is difficult to control during the film formation, and if the concentration is high the viscosity of the polymer solution becomes higher, and thus a long time is required for the filtration and the gas permeation rate of the asymmetric membrane obtained is lowered. Therefore, most preferably the concentration of the polymer solution is 15 to 25 parts by weight of the polysulfone based on 100 parts by weight of the solvent.

During the preparation of the polysulfone asymmetric skinned membrane, if a part of the solvent is vaporized in a high temperature drying gas after the polymer solution is coated onto a glass plate or extruded through a hollow fiber spinning skinneret, the formation of the skin layer is promoted and the oxygen/nitrogen selectivity improved. The treatment time depends on the solvent of the polymer solution and the temperature of the high temperature drying gas but, for example, in the case of a polymer solution obtained by dissolving 20 parts of the polysulfone in 100 parts by weight of N,N-dimethylacetamide, at a dry gas temperature of 140° C., preferably the treatment time is 5 minutes, to obtain the required effect. If the temperature of the high temperature drying gas is higher, the required treatment time must be shortened.

After drying, the obtained polysulfone asymmetric skinned membrane can be subjected to a heat treatment at a temperature of 120° C. or higher, but not higher than the glass transition point of the polysulfone, to improve and stabilize the properties thereof. The treatment time depends on the treatment temperature, but the required effect is obtained in 30 minutes at 120° C. For example, when a large amount of hollow fiber membranes is prepared, a lowering of and variations in the membrane properties may occur during the drying process, but these inherent membrane performances can be restored by a heat treatment at 140° C. for 1 hour. Also, if the membrane inherently has a lower gas selectivity, the gas selectivity can be improved by applying a heat treatment at a temperature slightly lower than the glass transition point thereof.

The polysulfone separation membrane and method of preparation thereof of the present invention provides a polysulfone separation membrane having a superior oxygen permeation rate and oxygen/nitrogen selectivity, and further, a high heat resistance, chemical resistance and mechanical strength, and enables the production of oxygen-enriched air with an oxygen concentration of 40%, which can be used for medical purposes, etc., or the production of a nitrogen-enriched air with a nitrogen concentration of 95% or more, in a large amount and at a low cost. As a result, the gas separation technique in which such a membrane is used can be widely applied.

EXAMPLES

The present invention will now be further illustrated by, but is by no means limited to, the following Examples. In the following Examples, the inherent viscosity ($\eta_{inh}$) of a solution of 0.5 g of the polymer in 100 ml of N-methyl-2-pyrrolidone at 30° C. was measured, the oxygen permeation coefficient and nitrogen permeation coefficient through a membrane were determined by using a membrane having a thickness of 30 μm, and one gas by Gas Perm 100, Nippon Bunko Co. The oxygen/nitrogen selectivity was defined as the ratio of the oxygen permeation coefficient to the nitrogen permeation coefficient. The permeation coefficient unit was expressed in Barrer ($= 10^{10}$ cm$^3$(STP)cm/cm$^2$sec cmHg).

The oxygen permeation rate and oxygen/nitrogen selectivity of the asymmetric membrane were obtained from the permeation rate and the concentration of oxygen and nitrogen of the permeated gas by gas chromatography, where feed gas is artificial air with an oxygen concentration of 21% and a nitrogen concentration of 79% at 2 kg/cm$^2$ at primary side, and permeated side (the secondary side) is an atmospheric pressure. The permeation speed unit was Nm$^3$/m$^2$hr atm.

EXAMPLE 1

Into a 1000 ml four-necked flask equipped with a nitrogen-introducing pipe, a Dean-Stark trap, a reflux condenser, and a stirring device were charged 0.10 mole of 9,9-bis(4-hydroxyphenyl)fluorene, 0.10 mole of 4,4'-dichlorodiphenylsulfone, 0.12 mole of potassium carbonate, 320 g of N,N-dimethylacetamide, and 450 ml of toluene, and the mixture was heated and stirred in a nitrogen atmosphere. The reflux temperature was suppressed at 120° C., the heating was continued for 6.5 hours to remove water by azeotropic distillation, the toluene then removed and the temperature of the solution elevated to 150° C., and thereafter, the azeotropic distillation of water as such was continued for 15 hours. After cooling, excessive potassium carbonate and potassium chloride by product were removed, and by reprecipitation into water and drying a polymer was obtained. The obtained polymer had an inherent viscosity ($\eta_{inh}$) of 1.57 dl/g. The polysulfone is represented as $[X_1/Y_1]$.

A 10 wt.% m-cresol solution of this polymer was coated on a glass substrate and m-cresol was completely evaporated to prepare a film with a thickness of 30 μm. The oxygen permeation coefficient $P_{O2}$) and nitrogen permeation coefficient ($P_{N2}$) of this sample were measured, and the oxygen/nitrogen selectivity ($\alpha$) was determined. The results are shown in Table 3.

TABLE 3

| | |
|---|---|
| Oxygen permeation coefficient ($P_{O2}$) | 1.5 Barrer |
| Nitrogen permeation coefficient ($P_{N2}$) | 0.24 Barrer |
| Oxygen/Nitrogen selectivity ($\alpha$) | 6.2 |

EXAMPLE 2

The polysulfone film of Example 1 was dipped in an aqueous solution of 5% sulfuric acid, 0.5% nitric acid, and 20% sodium hydroxide for 48 hours, followed by air drying. There were no substantial changes in the oxygen permeation coefficient, nitrogen permeation coefficient and oxygen/nitrogen selectivity of the resultant film.

EXAMPLE 3

Into a 1000 ml four-necked flask equipped with a nitrogen-introducing pipe, a Dean-Stark trap, a reflux condenser, and a stirring device were charged 0.10 mole of 9,9-bis(4-hydroxyphenyl)fluorene, 0.10 mole of 4,4'-dichlorodiphenylsulfone, 0.12 mole of potassium carbonate, 320 g of N,N-dimethylacetamide, and 100 ml of toluene, the mixture was heated in a nitrogen atmosphere, and distilled out toluene was removed until the reaction temperature became 150° C. The reaction was carried out for 15 hours, the reaction mixture then cooled to room temperature, potassium chloride filtered off, and the filtrate poured into methanol to effect re-precipitation and quantitatively obtain a polymer with an inherent viscosity ($\eta_{inh}$) of 0.59 g/dl. The polysulfone is represented as $[X_1/Y_1]$.

A 10 wt. % m-cresol solution of this polymer was coated on a glass substrate, and m-cresol was completely evaporated to prepare a film with a thickness of 30 μm. The oxygen permeation coefficient ($P_{O2}$) and nitrogen permeation coefficient ($P_{N2}$) of this sample were measured, and the oxygen/nitrogen selectivity ($\alpha$) was determined. The results are shown in Table 4.

TABLE 4

| | |
|---|---|
| Oxygen permeation coefficient ($P_{O2}$) | 1.3 Barrer |
| Nitrogen permeation coefficient ($P_{N2}$) | 0.20 Barrer |

TABLE 4-continued

| | |
|---|---|
| Oxygen/nitrogen selectivity ($\alpha$) | 6.4 |

EXAMPLE 4

Into a 200 ml four-necked flask equipped with a nitrogen introducing pipe, a Dean-Stark trap, a reflux condenser, and a stirring device were charged 20 mmole of 9,9-bis(4-hydroxyphenyl)fluorene, 19.8 mmole of 4,4'-dichlorodiphenylsulfone, 0.2 mmole of 3,3',4,4'-tetrachlorodiphenylsulfone, 22 mmole of potassium carbonate, 50 g of N,N-dimethylacetamide, and 30 ml of toluene, and the same procedures as in Example 1 were carried out to obtain a polymer having an inherent viscosity ($\eta_{inh}$) of 1.09 dl/g. The polysulfone is represented as $[X_1/Y_1-Y_2(0.99-0.01)]$.

A 10 wt. % m-cresol solution of this polymer was coated on a glass substrate, and m-cresol was completely evaporated to prepare a film with a thickness of 30 μm. The oxygen permeation coefficient ($P_{O2}$) and nitrogen permeation coefficient ($P_{N2}$) of this sample were measured, and the oxygen/nitrogen selectivity ($\alpha$) was determined. The results are shown in the following Table.

TABLE 5

| | |
|---|---|
| Oxygen permeation coefficient ($P_{O2}$) | 0.78 Barrer |
| Nitrogen permeation coefficient ($P_{N2}$) | 0.11 Barrer |
| Oxygen/nitrogen selectivity ($\alpha$) | 7.2 |

EXAMPLE 5

A solution of 1 part by weight of a polysulfone $[X_1/Y_1]$ [$\eta_{inh}$=0.83] dissolved in 100 parts by weight of purified N,N-dimethylacetamide was coated on a commercially available porous Teflon flat membrane with a nominal pore diameter of 0.1 μm and a membrane thickness of 100 μm (Fluoropore Filter manufactured by Sumitomo Denko) to a membrane thickness of 15 μm, by a bar coater, and then dried at 140° C. to prepare a composite membrane. The polysulfone composite membrane was set on a sample holder, and the oxygen permeation rate and oxygen/nitrogen selectivity thereof were measured. The results are shown in Table 6. The thickness of the gas selective active layer of this composite membrane was found to be about 120 nm, by SEM observation.

TABLE 6

| Measurement temperature °C. | Oxygen permeation rate ($Nm^3/m^2 \cdot hr \cdot atm$) | Oxygen/nitrogen selectivity (—) |
|---|---|---|
| 25 | $2.0 \times 10^{-2}$ | 6.2 |
| 40 | $2.7 \times 10^{-2}$ | 5.6 |
| 80 | $5.2 \times 10^{-2}$ | 4.4 |
| 120 | $9.0 \times 10^{-2}$ | 3.7 |
| 200 | $2.0 \times 10^{-1}$ | 2.8 |

As shown in Table 6, the polysulfone composite membrane of the present invention has a superior oxygen permeation rate, oxygen/nitrogen selectivity, and heat resistance.

EXAMPLE 6

In 100 parts of a purified N,N-dimethylacetamide were dissolved 20 parts by weight of a polysulfone $[X_1/Y_1]$ [$\eta_{inh}$=0.83], in a dry nitrogen atmosphere, and the resultant solution was filtered through a Teflon filter with a pore diameter of 10 μm to form a membrane fabricating solution. The membrane fabricating solution was coated on a glass plate to a membrane thickness of 100 μm, by a bar coater and then immersed in water at 4° C. to form an asymmetric skinned membrane in the wet state. The wet asymmetric membrane was dried in air and then subjected to a heat treatment at 140° C. for one hour to obtain a polysulfone asymmetric skinned gas separation membrane. The polysulfone asymmetric gas separation membrane was set on a sample holder, and the oxygen permeation rate and oxygen/nitrogen selectivity thereof were measured. The results are shown in Table 7.

TABLE 7

| Measurement temperature °C. | Oxygen permeation rate $(Nm^3/m^2 \cdot hr \cdot atm)$ | Oxygen/nitrogen selectivity (—) |
| --- | --- | --- |
| 25 | $5.1 \times 10^{-1}$ | 2.3 |
| 40 | $6.8 \times 10^{-1}$ | 1.9 |

As shown in Table 7, the polysulfone asymmetric gas separation membrane of the present invention has a high oxygen permeation rate.

EXAMPLE 7

In 100 parts of a purified N-methyl-2-pyrrolidone were dissolved 20 parts by weight of a polysulfone $[X_1/Y_1]$ $[\eta_{inh}=0.83]$, in a dry nitrogen atmosphere, and the resultant solution was filtered through a Teflon filter with a pore diameter of 10 μm to form a membrane fabricating solution. The membrane fabricating solution was coated on a glass plate to a membrane thickness of 100 μm, by a bar coater, placed in a dry air atmosphere of 140° C. for 5 minutes to evaporate a part of the solvent, and then immersed on water at 4° C. to form an asymmetric skinned membrane in the wet state. The wet asymmetric membrane was dried in air and then subjected to a heat treatment at 140° C. for one hour to obtain a polysulfone asymmetric skinned gas separation membrane. The polysulfone asymmetric gas separation membrane was set on a sample holder, and the oxygen permeation rate and oxygen/nitrogen selectivity thereof were measured. The results are shown in Table 8.

TABLE 8

| Measurement temperature °C. | Oxygen permeation rate $(Nm^3/m^2 \cdot hr \cdot atm)$ | Oxygen/nitrogen selectivity (—) |
| --- | --- | --- |
| 25 | $4.1 \times 10^{-2}$ | 3.0 |
| 40 | $5.6 \times 10^{-2}$ | 2.7 |
| 80 | $1.1 \times 10^{-1}$ | 2.1 |
| 120 | $2.1 \times 10^{-1}$ | 1.8 |
| 200 | $4.3 \times 10^{-1}$ | 1.3 |

As shown in the Table 8, the polysulfone asymmetric gas separation membrane of the present invention has a superior oxygen permeation rate and heat resistance.

EXAMPLE 8

In 100 parts by weight of a purified N-methyl-2-pyrrolidone were dissolved 17.5 parts by weight of a polysulfone $[X_1/Y_1]$ $[\eta_{inh}=0.85]$ and 5 parts by weight of lithium chloride, and the resultant solution was subjected to a heat treatment at 150° C. for 15 hours and then the resultant solution was filtered through a Teflon filter with a pore diameter of 10 μm, to form a membrane fabrication solution. The membrane fabricating solution was extruded by a double-tube spinneret, wherein the membrane fabrication solution was extruded through the annular opening of the spinneret and water flowed continuously through the circular opening, and after a 40 cm run through air, immersed in a coagulation water bath to fabricate a wet asymmetric hollow fiber membrane.

The hollow fiber membrane obtained was dried in air to obtain a polysulfone hollow fiber membrane with an outer diameter of 0.3 mm. FIG. 1 shows the SEM image of the hollow fiber membrane. The hollow fiber membrane obtained was assembled into a minimodule, and the oxygen permeation rate and oxygen/nitrogen selectivity thereof were measured. The results are shown in Table 9.

TABLE 9

| Measurement temperature °C. | Oxygen permeation rate $(Nm^3/m^2 \cdot hr \cdot atm)$ | Oxygen/nitrogen selectivity (—) |
| --- | --- | --- |
| 20 | $8.8 \times 10^{-2}$ | 5.5 |
| 40 | $1.6 \times 10^{-1}$ | 4.9 |

As shown in Table 9, the polysulfone asymmetric gas separation membrane of the present invention has a superior oxygen permeation rate and oxygen/nitrogen selectivity.

EXAMPLE 9

The polysulfone asymmetric hollow fiber membrane obtained in Example 8 was sealed at one end, and water was gradually injected under pressure from the open end thereof. As the result, the hollow fiber membrane was broken at a pressure of 15 kgf/cm². This example shows that the polysulfone asymmetric gas separation membrane has a superior mechanical strength.

COMPARATIVE EXAMPLE 1

In 100 parts by weight of a purified m-cresol were dissolved 20 parts by weight of polysulfone $[X_1/Y_1]$ $[\eta_{inh}=0.83]$ and the resultant solution was then filtered through a Teflon filter with a pore diameter of 10 μm to form a membrane fabricating solution. The membrane fabricating solution was extruded by a double-tube spinneret, wherein the membrane fabrication solution was extruded through the annular opening of the spinneret and ethanol flowed continuously through the circular opening, and after a 10 cm run through the air, immersed in an ethanol coagulation bath to fabricate a hollow fiber membrane. The hollow fiber membrane obtained was dried in air and then subjected to a heat treatment at 140° C. for 1 hour, to obtain a polysulfone asymmetric hollow fiber membrane with an outer diameter of 0.7 mm. The hollow fiber membrane obtained was assembled into a minimodule, and the oxygen permeation rate and oxygen/nitrogen selectivity thereof were measured. The results are shown in Table 10.

TABLE 10

| Measurement temperature °C. | Oxygen permeation rate $(Nm^3/m^2 \cdot hr \cdot atm)$ | Oxygen/nitrogen selectivity (—) |
| --- | --- | --- |
| 40 | $2.7 \times 10^2$ | 1.0 |

This preparation method used m-cresol as the solvent for the polymer and ethanol as the coagulation liquid, and thus an oxygen/nitrogen separation membrane could not be obtained.

We claim:

1. A separation membrane comprising a soluble aromatic polysulfone having the formula —(X-Y)—, wherein X and Y are the constituent units shown below, and having an inherent viscosity ($\eta_{inh}$) of at least 0.4 dl/g, measured from a solution of 0.5 g of said polysulfone dissolved in 100 ml of N-methyl-2-pyrrolidone at 30° C.

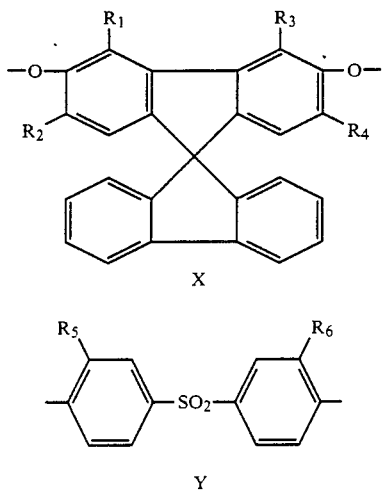

wherein $R_1$ to $R_4$ are independently H, $CH_3$ or $C_2H_5$, and $R_5$ and $R_6$ are independently H, Cl or $NO_2$.

2. A polysulfone separation membrane as claimed in claim 1, wherein the soluble polysulfone contains 1% to 99% of the constituent unit Y, in which at least one of $R_5$ and $R_6$ is Cl.

3. A polysulfone composite membrane comprising a soluble aromatic polysulfone of claim 1 as a gas selective active layer, said gas selective active layer being provided at a thickness of 10 nm to 1 μm on a porous support, wherein the surface of said support has a pore diameter of up to 1 μm.

4. A polysulfone asymmetric skinned gas separation membrane derived from a soluble aromatic polysulfone of claim 1, by dissolving said soluble aromatic polysulfone in a polar solvent to form a polymer solution, followed by desolventizing the solution by contact with a coagulation liquid which is miscible with the solvent of said polymer solution but does not dissolve said polysulfone.

5. An aromatic polysulfone having the formula X-Y, wherein X and Y are the constituent units shown below, and having an inherent viscosity ($\eta_{inh}$) of at least 0.4 dl/g, measured from a solution of 0.5 g of said polysulfone dissolved in 100 ml of N-methyl-2-pyrrolidone at 30° C.

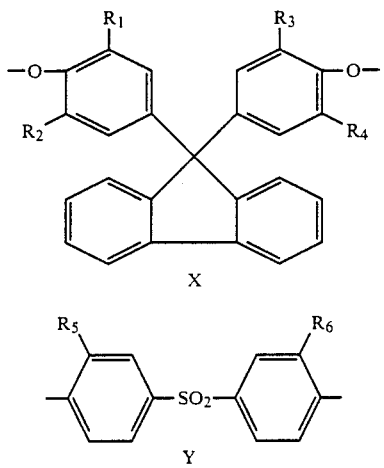

wherein $R_1$ to $R_6$ are independently H, $CH_3$ or $C_2H_5$, and $R_5$ and $R_6$ are independently H, Cl or $NO_2$, provided that at least one of $R_5$ and $R_6$ is Cl.

* * * * *